June 10, 1969  H. J. MODREY ETAL  3,448,894
DISPENSING DEVICE FOR SINGLY DISPENSING MAGNETIZABLE ITEMS
Filed July 31, 1967

Inventors
HENRY J. MODREY
GERHARD STEINMEYER
BY Hane and Bayley
ATTORNEYS

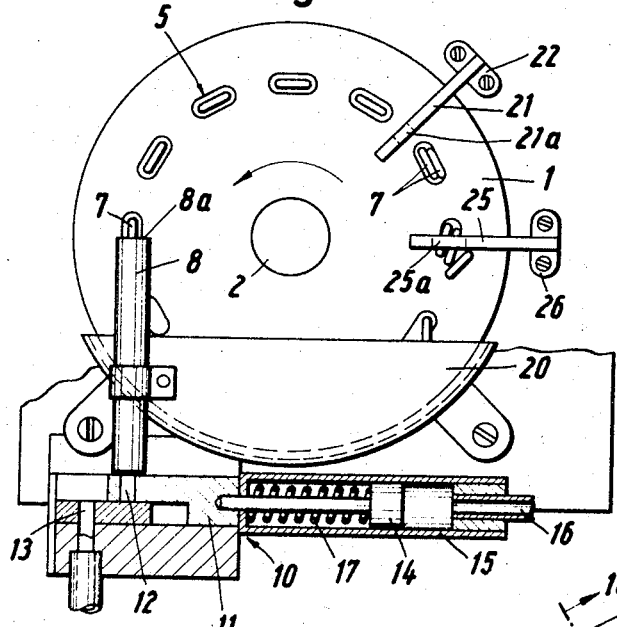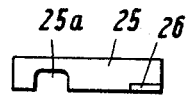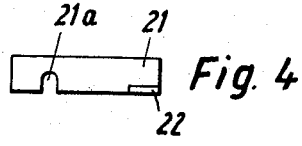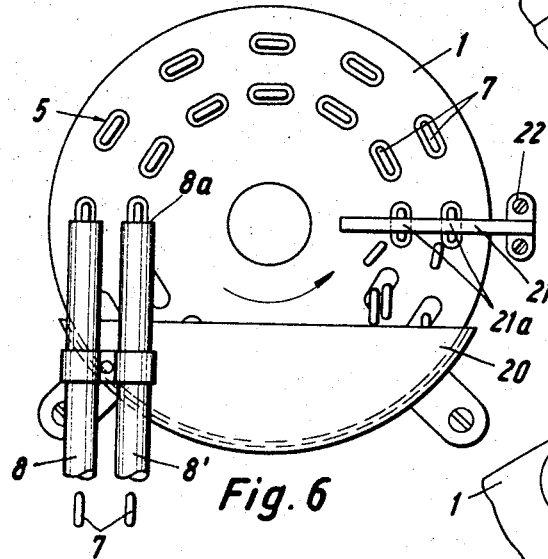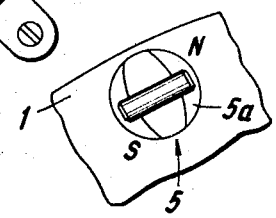

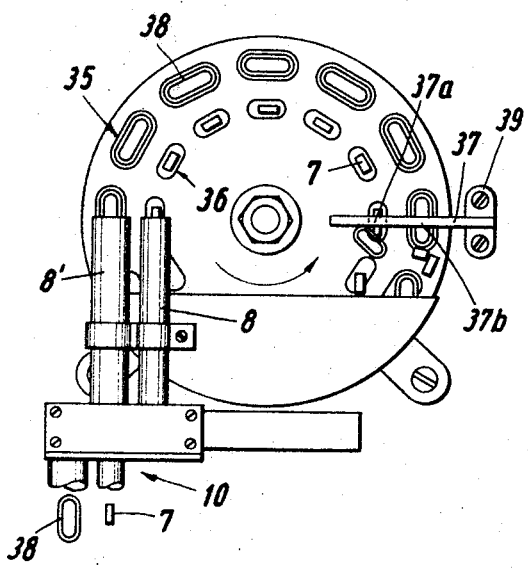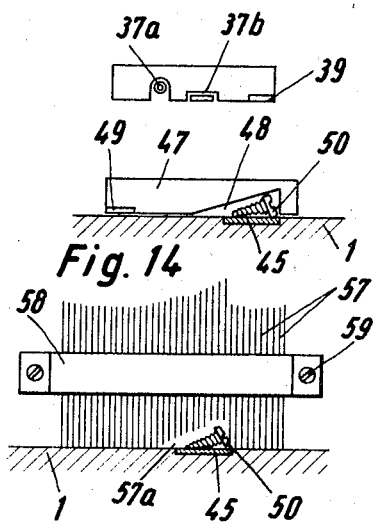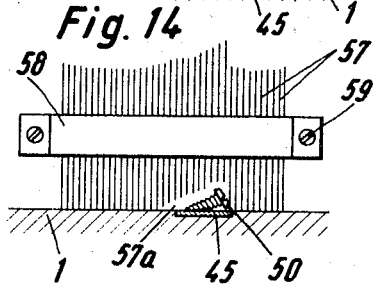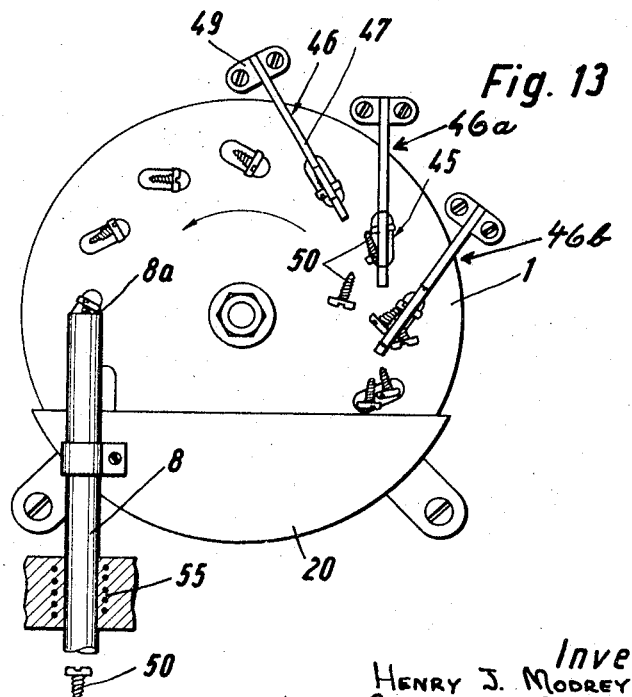

Inventors
HENRY J. MODREY
GERHARD STEINMEYER
BY Hane and Bayley
ATTORNEYS

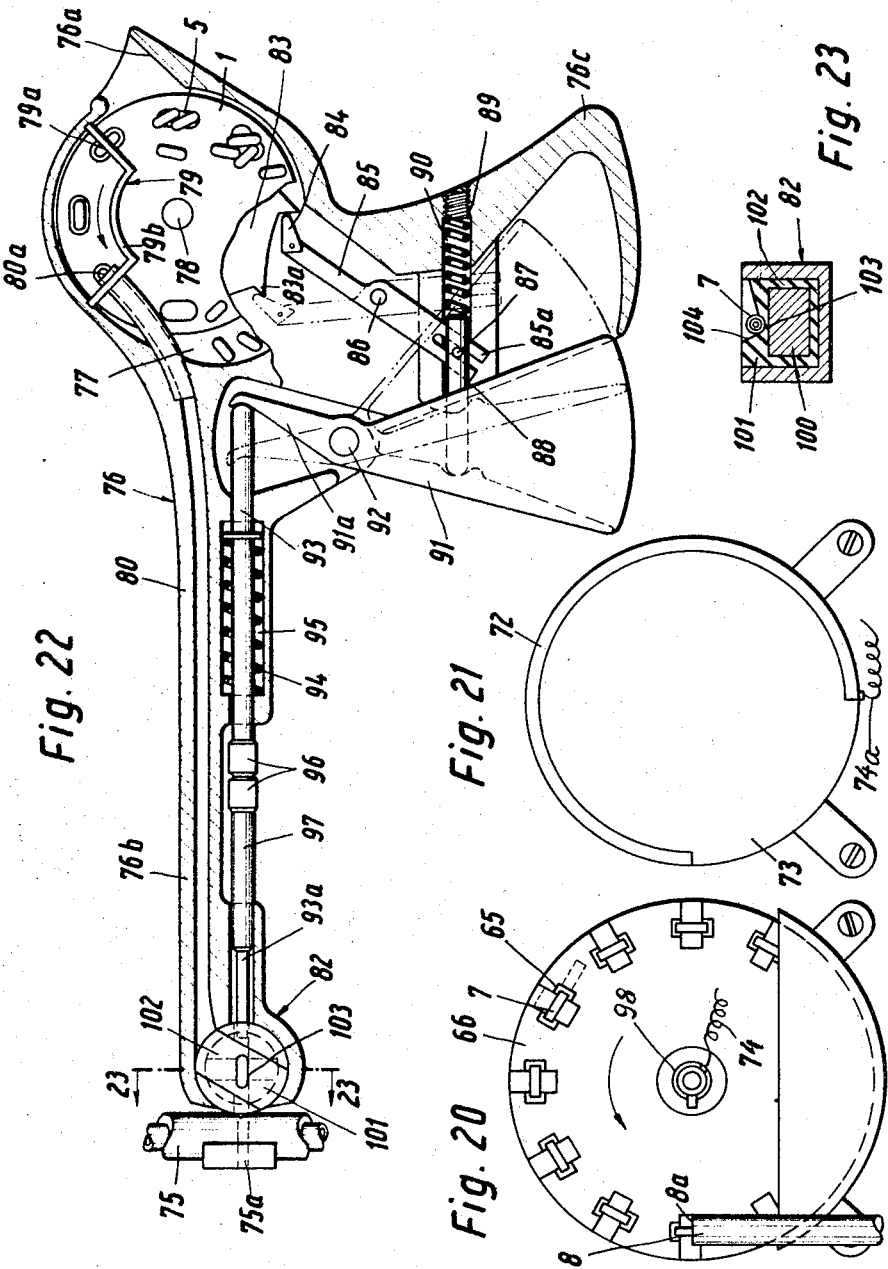

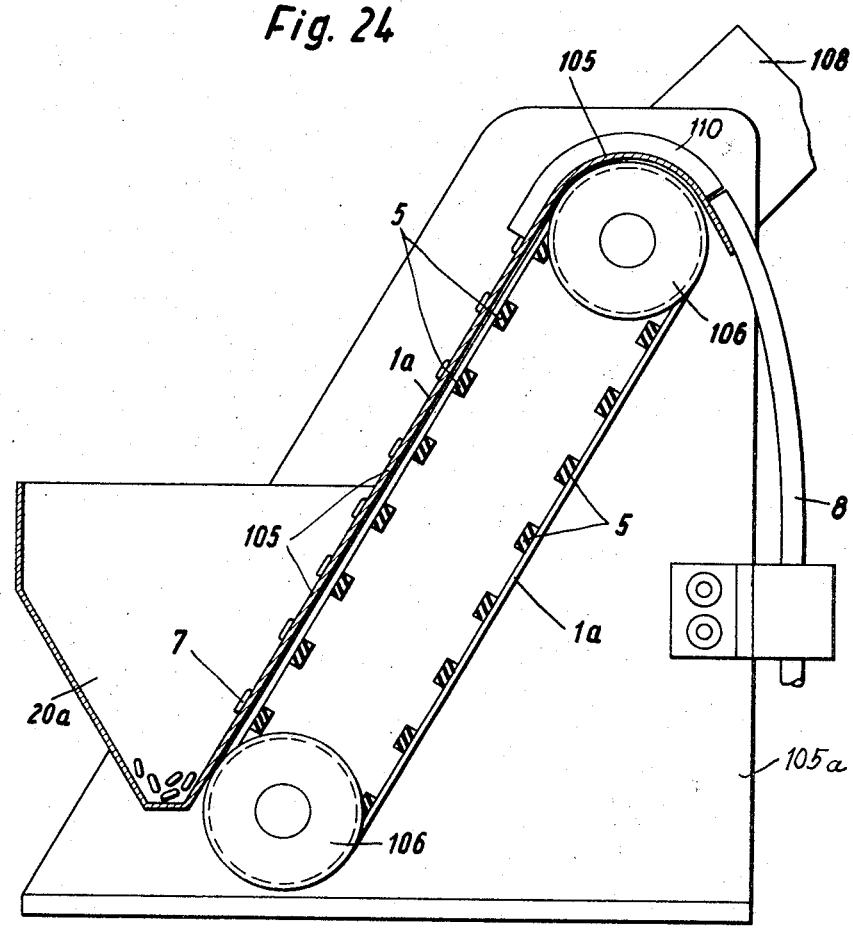

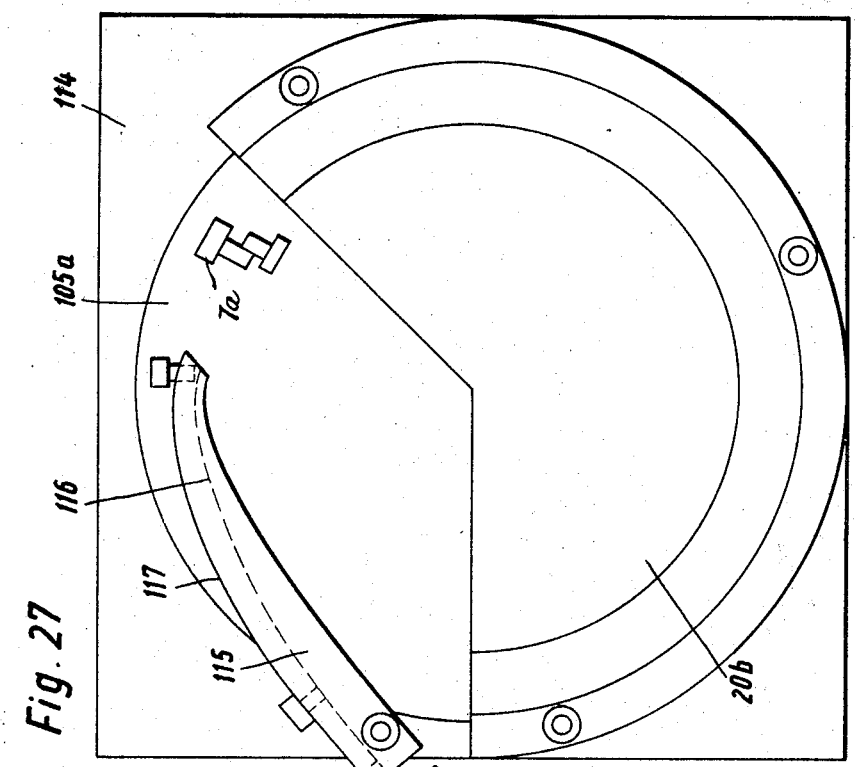
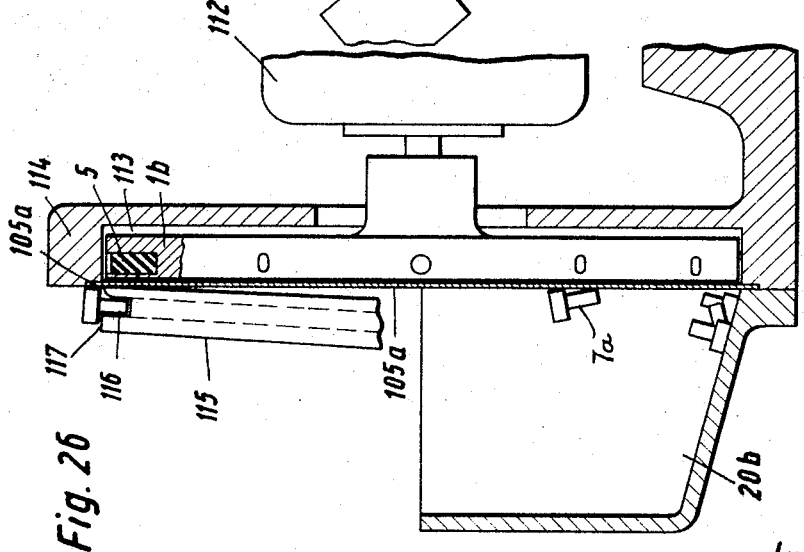

United States Patent Office 3,448,894
Patented June 10, 1969

3,448,894
DISPENSING DEVICE FOR SINGLY DISPENSING MAGNETIZABLE ITEMS
Henry John Modrey, Eagle Drive, Stamford, Conn. 06903, and Gerhard Steinmeyer, Heppen, Kreis Bielefeld, Germany; said Steinmeyer assignor to said Modrey
Filed July 31, 1967, Ser. No. 657,232
Claims priority, application Germany, Mar. 23, 1967, M 73,316
Int. Cl. B23q 7/12; B65h 9/00
U.S. Cl. 221—160      31 Claims

ABSTRACT OF THE DISCLOSURE

There is disclosed a dispensing device for automatically withdrawing discrete items such as pins, rivets, screws, etc., from a supply and dispensing the items one by one. The items, after being picked up from the supply, singly or in clusters, are singled and positioned by magnetic action and selector means.

---

The present invention relates to a dispensing device for automatically withdrawing discrete items such as pins, rivets, screws, nails, washers, eyelets, etc., from a supply and dispensing the items one by one, and more particularly, to a dispensing device or feeder magazine for successively and singly dispensing discrete items made of or containing magnetizible material by utilizing magnetic attraction for the withdrawal of the items from the supply and for transporting the items.

It is a broad object of the invention to provide a novel and improved magnetically operated dispensing device of the general kind above referred to which dispenses a practically continuous flow of items in an oriented position and at selected intervals.

It is also an object of the invention to provide a novel and improved dispensing device of the general kind above referred to in which the items to be dispensed are positively held by magnetic attraction while being transported to a discharge station and are also oriented by the magnetic attraction so that they are positioned for entering the discharge station while being so transported.

Another object of the invention is to provide a novel and improved magnetically operated dispensing device of the general kind above referred to which is capable of regularly dispensing oriented items one by one at a much higher operational speed than is obtainable with dispensing devices as heretofore known.

Still another object of the invention is to provide a novel and improved magnetically operated dispensing device which can be conveniently, rapidly and inexpensively adapted, within a wide range, to items of different shapes and sizes.

A further object of the invention is to provide a novel and improved magnetically operated dispensing device in which the items are automatically and at a high speed dispensed in a desired directional orientation, for instance, rivets, headed screws, etc. may be dispensed with the shank or point facing forwardly.

A still further object of the invention is to provide a novel and improved magnetically operated dispensing device which can be readily combined with similar dispensing devices in a structural unit with a common drive so that the items are dispensed in batches. Several items of the same kind or different items may be dispensed in this manner, either simultaneously or staggered.

Still another object of the invention is to provide a novel and improved dispensing device of the general kind above referred to in combination with mechanically or electromagnetically controlled escapement or ejection means for removing singled and oriented items from the dispensing device and feeding the items, one by one, to a point of utilization.

It is also an object of the invention to provide a novel and improved hand tool or power tool in which a dispensing device according to the present invention and an item orienting device as disclosed in copending application Ser. No. 476,839, filed Aug. 3, 1965 by Henry J. Modrey and issued as Patent 3,346,942 on Oct. 17, 1967, are combined for withdrawing items from a supply, feeding the items one by one to the orienting device and inserting the oriented items into successive workpieces.

Broadly, the aforementioned objects, features and advantages of the invention and other objects, features and advantages which will be pointed out hereinafter, are attained by providing an endless conveyor of nonmagnetic material mounting a plurality of magnetic elements spaced apart in the direction of movement of the conveyor, and positioned to dip into a supply of the items during part of the travel of the conveyor whereby each of the magnetic elements will pick up and carry along sometimes only one item but more often a cluster of items in random positions, and by further providing a selector means positioned to be engaged by successive magnetic elements and including a passage opening or gate permitting passage of only one item per magnetic element for discharge of said item upon passage of the opening.

The outline of the passage opening or gate of the selector means is selected in accordance with the configurations of the items to be dispensed. If an elongated item such as a pin is to be dispensed, the outline of the gate corresponds to the cross-section of the pin. The pin can therefore pass the gate only in a substantially lengthwise position, and if the item is circular such as a washer or a disk, the outline of the gate is such that one washer can pass but any superimposed washer is removed from the respective magnetic element by the relative movement of the selector means and the magnetic elements. In the event the item is a headed item such as a headed screw, the outline of the gate is profiled to correspond approximately to the lengthwise outline of the screw, and the selector means and also the magnetic elements are slanted in reference to the direction of travel of the conveyor so that the screws can pass the gate only if a selected end of the screw such as the shank thereof faces forwardly or rearwardly, as desired.

Orientation of items singly to be dispensed so that a selected portion of the items faces forwardly when reaching the discharge station, for instance, so that a screw or pin is discharged with the shanks thereof facing forwardly can further be obtained in accordance with the invention by providing a discharge chute which is so profiled that it can be entered by an item only when the selected portion thereof is in the forward direction.

The surface area of each of the magnetic elements such as pads fitted in the conveyors substantially flush with the surafce thereof, is preferably larger than that of the largest item intended to be sorted and dispensed by the device. As a result, the items while being positively retained on the magnetic elements by magnetic attraction and carried along by the same are free to move on the surface of the elements into different positions in reference thereto and also in reference to other items retained on the same magnetic element. Accordingly, an item which happens to be so positioned that it can enter the passage opening to the smallest extent will automatically slide or wriggle into a position in which it is pulled through the opening due to the continuous movement of the magnetic elements in reference to and past the selector means. Extensive tests have shown that in practically all cases one item in each cluster formed on a magnetic element approaching the selector means, is so positioned that it is in a position in which at least a small portion of the item can enter the opening. As a result, such one item will, so to speak, wriggle itself into a position in which it is so aligned with the opening that it can pass the same. The remaining items in the cluster will fall back into the supply of items when the respective magnetic element passes the selector means. The spacing between the magnetic elements, must of course, be such that there is sufficient space and time for the rejected item to fall back into supply before the respective selected item reaches the discharge station. In other words, the coaction of the stationary selector means and the moving magnetic elements automatically singles out one item on practically all magnetic elements for passage through the opening of the selector means and subsequently orients said item.

A comparatively long travel distance is preferably provided between the selector means and the discharge station. Such longtravel distance allows the single item adhered to a magnetic element to position itself accurately in the north-south direction on the element as it is not impeded by other items adhered to the same magnetic element.

The use of large size magnetic elements has the further advantage that a wide range of differently sized items including very small and lightweight items can be handled by the same dispensing device without requiring a change thereof except for the selector means the passage opening of which must, of course, be selected in accordance with the dimensions of the specific items to be dispensed. Conventional dispensing devices relying for transport of the items upon vibration and/or gravity are generally not capable of sorting and dispensing very small and lightweight items, or at best such items are dispensed at large and irregular intervals. The action of a gravitational and/or vibrational force upon a very small mass is obviously slight so that small and light weight items are not safely carried by the conveyor of the device and tend to jam the device. In contradistinction thereto, the positive magnetic traction used in the device of the invention will safely and reliably carry even the smallest items past the selector means and to the discharge station.

According to one embodiment of the invention, diminution of clusters or attracted items to a single item and orientation of such single item for discharge from the conveyor to a point of use can be effected in one or several stages. For diminuation in several stages, successive selector means are provided which gradually reduce the number of attracted items to one and also effect a preliminary or initial orientation of the items. The final orientation is effected at a closely dimensioned gate which may be combined with or formed by the entry opening of a discharge chute.

According to another preferred embodiment of the invention, a positive magnetic preorientation force is applied to the items by disposing the maximal magnetic flux direction of each magnetic element or pad so that an item occupying this direction will be directly guided into the passage opening of the selector means. Obviously, if a magnetic element is occupied by a single item only such item will automatically place itself in lengthwise alignment with the maximal magnetic flux direction and if a magnetic element is occupied by a cluster of items at least one of these items is likely to occupy more or less a position in alignment with the maximal flux direction while the other items in the cluster occupy more or less random positions. The desired orientation of the magnetic field can be readily obtained by placing the poles of the magnetic in alignment with the general direction of movement of the conveyor.

According to another preferred embodiment of the invention, a positive mechanical orientation force is applied to the items by providing a guide track such as a groove extending in the direction of travel of the items. The width of the track is such that any items therein are maintained in positions substantially oriented for entry into the opening of the selector means. The magnetic elements are provided spaced apart in the tracks for instance at the bottom of a guide groove. A specific orientation of the flux lines of the elements is not necessary due to the directional action of the guide track.

The passage opening of the selector means may constitute the entry opening of a discharge chute, or a separate selecting member including a gate and a separate discharge chute may be provided.

According to still another embodiment of the invention, the selector member is exchangeably mounted so that the outline of the gate thereof may be readily adapted to the configurations of different items by exchanging a member for another one, or the outline of the gate may be adjustable for the same purpose. According to one preferred embodiment of the invention a change in the outline of the gate of selector means may be effected by providing a selector means composed of a plurality of elements defining in conjunction the outline of the gate. These elements are mounted adjustable in reference to each other so that the outline of the gate can be conveniently varied by changing the setting of the elements. The gate defining elements may be set for instance in accordance with the approximate outline of a headed screw or rivet, or in accordance with the thickness and diameter of a washer.

The magnetic elements may be permanent magnets or electromagnets. In the latter case, the current supply to the electromagnets may be interrupted at predetermined intervals thereby causing items which have passed the gate of the selector member to be released from the conveyor.

According to still another embodiment of the invention several parallel rows of magnetic elements and associated selector members defining gates may be provided on one conveyor, or several conveyors each bearing one or several rows of magnetic elements and associated selector members may be driven by a common drive means. With such arrangements several items, either alike or different one from another, can be dispensed simultaneously or staggered in reference to each other.

According to another preferred embodiment of the invention, the endless conveyor comprises one or several rotary disks mounting on one or both sides the magnetic elements in circumferentially spaced relationship. The conveyor may also be in the form of a rotary drum mounting the elements on its peripheral wall in circumferentially spaced relationship.

According to another preferred embodiment of the invention, the magnetic elements are mounted on an endless conveyor band and travel in unison with the conveyor behind and closely adjacent to a stationary support plate made of nonmagnetizable sheet material so that the items are retained by magnetic attraction on the support plate and pulled along the same as the magnetic elements travel in reference to the plate. A dispensing system of this type has the advantage that selected movements can be imposed upon the items as the same move on the support plate, either by correspondingly changing the travel path of the magnetic elements or by guides on the side of the plate supporting the items. An additional advantage of such device is that wear and tear manifests itself only at the support plate rather than at the magnetic elements and obviously the sheet metal support plate can be simply and inexpensively replaced.

The invention also encompasses a dispensing device for singly and selectively dispensing items that are only slightly different from each other at opposite ends, for instance, pins which have notches at one end, or have a slightly enlarged or tapered portion at one end, with a predetermined end facing forwardly. The device for this specific purpose includes probe means which probe the items as they reach the probe means and direct each item to one of several discharge chutes, depending upon whether one or the other end of the items faces forwardly. The items so presorted are then fed by the chutes to a receiving station in a manner such that all items face in the desired direction in the receiving station.

The invention further includes the incorporation of a dispensing device or feeder magazine according to the present invention and of the magnetic orienting and holding device according to the aforesaid Patent 3,346,942 in a manually or power operated tool such as a gun type tool. Each actuation of this tool for instance, by squeezing a trigger, selects an item such as a pin from a storage space within the tool, orients the item and feeds it in its oriented position into an opening of a workpiece or to another point of use.

In the accompanying drawing, several preferred embodiments of the invention are shown by way of illustration and not by way of limitation.

In the drawing:

FIG. 3 is a fragmentary elevational side view of a modification of the dispensing device;

FIG. 4 is a side view of one of the selectors of the device;

FIG. 5 is a side view of another selector of the device;

FIG. 6 is a fragmentary elevational side view of another modification of the device;

FIG. 7 is a side view of a selector of the device of FIG. 6;

FIG. 8 is a detail plan view of the magnetic elements of any of the devices according to FIGS. 1, 2, 3 and 6, on an enlarged scale;

FIG. 8A is a plan view of a modification of the magnetic elements;

FIG. 9 is a fragmentary view of a modification applicable to any of the devices according to FIGS. 1, 2, 3 and 6;

FIG. 10 is a section taken on line 10—10 of FIG. 9;

FIG. 11 is a fragmentary elevational view of a double dispensing device for dispensing differently shaped items;

FIG. 12 is a side view of a selector of the device according to FIG. 11;

FIG. 13 is a fragmentary elevational side view of a further modification of the device for dispensing items facing forwardly with a predetermined end;

FIG. 14 is a side view of the selector of the device according to FIG. 13;

FIG. 15 is a detail view of an adjustable selector for use for instance with a device according to FIG. 13;

FIG. 20 is a view upon a disk of the device supporting the electromagnetic elements;

FIG. 21 is a view upon a commutator disk for supplying current to the electromagnetic elements;

FIG. 22 is a side view, partly in section, of a hand tool for feeding pins to workpieces, the tool including a feeder magazine or a dispensing device according to the invention;

FIG. 23 is a detail view, partly in section, of a component of FIG. 22;

FIG. 24 is an elevational side, partly in section, of a still further dispensing device according to the invention;

FIG. 26 is an elevational edge view, partly in section, of still another dispensing device according to the invention;

FIG. 27 is a plan view of FIG. 26;

Figure 1:
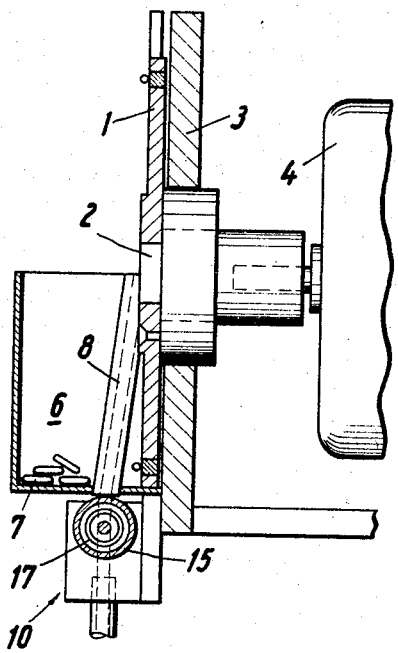
FIG. 1 is an elevational sectional end view of a dispensing device or feeder magazine according to the invention.
Figure 2:
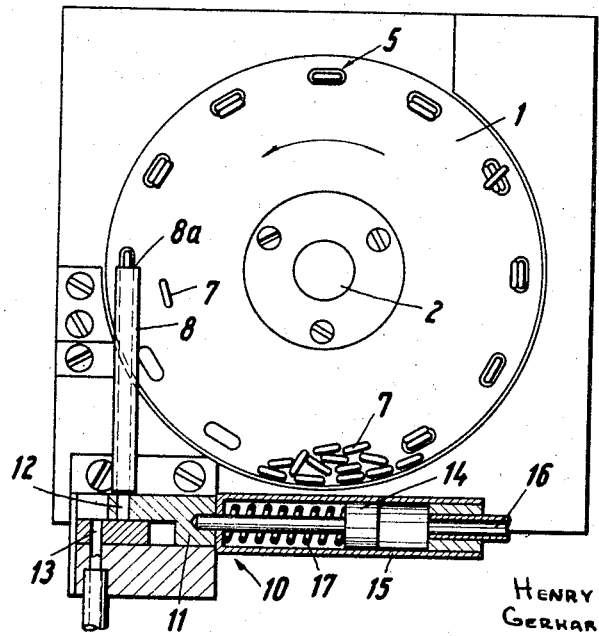
FIG. 2 is an elevational side view of FIG. 1 partly in section.

Referring first to FIGS. 1 and 2 more in detail, the feeder magazine or dispensing device exemplified in these figures comprises a disk 1 made of a suitable nonmagnetic material such as plastic or nonferrous metal. The disk is mounted on a shaft 2 suitably journalled in a frame structure 3 and driven in counterclockwise direction by a motor 4. The disk mounts on one of its sides a plurality of circumferentially spaced magnetic elements or magnet pads 5. These elements are generally permanent magnets, but may also be electromagnetic elements as will be more fully explained in connection with FIGS. 19, 20 and 21. The elements are in the form of flush or slightly sunk magnetic pads, the north-south polarity of which is disposed in circumferential or peripheral direction. As is shown in FIG. 2, the magnetic elements are preferably elongate in peripheral direction. Various shapes of magnets may be used such as magnet bars as shown in FIG. 8, or generally U-shaped magnets 5a as shown in FIG. 8A.

The frame structure mounts a bin or receptacle 6 for a supply of magnetizable discrete small items such as pins 7, either of the rolled type or the solid type. The items may be made of or contain ferrous metals such as steel, or may be coated with suitable magnetizable material. Disk 1 is so disposed that the magnetic elements thereon will dip into bin 6 during part of each revolution of the disk. As is evident, one or several items will be attracted by each element 5 as the same passes through the supply of items and will be carried along by the disk. Accordingly, the disk and the magnetic elements thereon constitute an endless conveyor. Obviously, the concept of the invention is not limited to the conveyor disk as shown in FIGS. 1 and 2. Various types of conveyors are disclosed in the present specification and other types of endless conveyors capable of picking up successive items by magnetic attraction and carrying the same toward a discharge location may be readily visualized.

The device further comprises a discharge chute 8 in the form of a tube of nonmagnetic material such as plastic or a nonferrous metal. The entry opening 8a of the tube is disposed in the path of travel of magnetic pads 5 and is so oriented that an elongate pad 5 when reaching the entry opening is substantially in lengthwise alignment therewith for a purpose which will be more fully explained hereinafter.

The feeder magazine or dispensing device as hereinbefore described, operates as follows:

Let it be assumed that disk 1 is driven in counterclockwise direction and that successive magnetic pads 5 pass through the supply of pins 7 in bin 6. At least one pin 7 will be attracted by each pad 5, but in actual practice a cluster of pins will be usually attracted by each pad. The pins in such cluster will occupy more or less random positions but one pin within each cluster is likely to orient itself more or less in the direction of the polarity of the pads as previously described and as is indicated in FIGS. 8 and 8A. In case only one pin adheres to a pad such pin will automatically place itself substantially in the north-south direction.

When now a pad carrying a cluster of pins reaches the entry opening 8a, the pin in the cluster which is oriented substantially in the direction of the polarity, will be safely pulled into discharge chute 8 by the positive traction of the moving pad. All the other pins in the cluster are retained at the rim of the discharge chute and are stripped off the respective pad as the same continues its travel past the entry opening of the chute. Such stripped off pins will fall back into the supply bin.

Let it now be assumed that none of the pins in a cluster are aligned with chute 8 to slide smoothly into the same, but that an edge of one of the pins protrudes somewhat into the entry opening. In such case, the respective pin will slide about on the pad until it is in position for entering the chute, the rim of tube 8 acting somewhat in the manner of a fulcrum. As stated before, the magnetic attraction while retaining the pins on the pads permits sliding movements of the pins in reference to the pad and each other. In other words, one pin per pad will wriggle itself into the proper entry position. In doing so, it blocks the chute opening to other pins on the same pad.

Accordingly, discharge chute 8 and more specifically its entry opening 8a constitute functionally a selector.

As stated before, practical tests have shown that on practically each pad one pin per pad reaches the correct entry position while all other pins are returned to the supply. Accordingly, pins are dispensed in a continuous flow at intervals determined by the peripheral spacing of the pads on disk 1 and the rotational speed of the disk.

The pins may be discharged directly through the chute to a point of utilization, or a release mechanism 10 constituting an intermediate storage may be provided. The release mechanism as shown, comprises a stepped plunger 11 including an escape bore 12 movable between a receiving position shown in FIG. 2 in which the bore is aligned with chute tube 8 and a discharge position in which the bore 12 is aligned with a duct 13. Plunger 11 may be controlled in a conventional manner by a piston 14 slidable in a cylinder 15 to which a pressure fluid may be intermittently supplied through a conduit 16. A spring 17 biases the piston into the position illustrated in FIG. 2. As is evident, each movement of piston 14 from the illustrated position into the position aligned with duct 13 will cause the release of one pin.

Turning now to FIGS. 3, 4 and 5, the feeder magazine or dispensing device as illustrated in these figures, corresponds in principle to the device described in connection with the preceding figures, that is, conveyor disk 1 bearing circumferentially oriented, spaced apart elongate magnetic pads 5 is rotated in counter-clockwise direction and the items such as pins 7 are discharged through discharge chute 8, either directly or via release mechanism 10. The supply of pins is stored in a bin 20 through which the disk passes for part of its travel.

The device of FIG. 3 is distinguished from the previously described device in that the sorting and orienting of the pins for leading the same into the discharge chute are effected in several stages while in the device of FIGS. 1 and 2 both the sorting and the orientation of the pins are effected at the entry opening 8a of the discharge chute.

As shown in FIG. 3 a selector member 21 in the form of a bar including a gate 21a is stationarily mounted by a suitable fastening means such as a bracket 22. The barrier constituted by bar 21 is radially oriented and gate 21a is disposed in the peripheral path of magnetic pads 5. The peripheral outline of the gate corresponds approximately to the cross-sectional outline of pins 7 so that a pin can pass through the gate only if it is substantially aligned with the same.

The device is preferably provided with a second selector member 25 also in the form of a radially disposed bar including a gate 25a and secured by suitable fastening means such as a bracket 26. The outline of gate 25a is such that it permits passage of several pins in side-by-side position for instance, two pins or a misaligned pin, while gate 21a passes only one substantially aligned pin as previously stated. However, the gates of both selectors may have the same outline in which case a pin which passes the first gate in a somewhat misaligned position, is further positioned when passing the second gate, the final positioning being effected by the polarity orientation of the pad when and while the same is travelling from the second gate to the discharge chute as is previously described.

Disregarding the presence and function of second selector 25, for the time being, the device of FIG. 3 operates as follows:

As previously stated, a cluster of pins rather than a single pin usually adheres to a magnetic pad 5 emerging from supply bin 20. Due to the polarity orientation of the pads, the one pin which first adheres to the respective pad or occasionally two pins, will lie substantially in the north-south direction, that is, in peripheral direction. Other pins in the cluster may lie across the first and the second pin because the first pin or the first two pins have already substantially closed the magnetic north-south field so that the polarity effect upon the additional pins is greatly reduced. When now the cluster approaches selector gate 21a and an end of one of the pins substantially oriented in the north-south position of the magnetic pads penetrates at least partly into the gate, a mechanical orientation of such pin commences. The magnetic pad tends to pull this pin deeper into the gate because the magnetic pad continues to move relative to selector 21. As previously explained, the pin is not rigidly but magnetically held on the pad so that it is capable of yielding to the pull of movement and of sliding freely on the pad without losing its hold thereon. From the viewpoint of an observer the pin which has engaged the gate initially, more or less deeply, starts to wriggle into and through the gate in a wormlike fashion pulled by positive magnetic traction. Once an item has been singled out from a cluster by traversing the gate, it orients itself in the direction of the magnetic polarity of the pad. When the pad has passed the gate, the remaining pins of the cluster are no longer retained on the disk as they are now forced upon the nonmagnetic surface thereof. Accordingly, all the pins except one will fall back into bin 20, the spacing between the pads providing sufficient space and time for such fallback.

The single remaining pin on the pad will continue its travel together with the same toward entry opening 8a of the discharge chute. While travelling from the gate 21a to entry opening 8a, the single remaining pin will orient itself accurately in the north-south direction of the magnetic pad so that it is smoothly guided into the discharge chute. If there should be a slight misalignment of the pin at the chute entry such remaining misalignment will be automatically corrected at the chute. While selector 21 is shown circumferentially spaced from the chute entry 8a, it may also be disposed directly adjacent thereto.

Let it now be assumed that the second selector 25 is provided anterior of selector 21. Gate 25a of this selector functions in substantially the same manner as gate 21a, except that gate 25a may pass several pins such as two pins in substantially north-south orientation. The principal purpose of selector 25 is to reduce the number of pins reaching selector 21 and also to preorient the remaining pins. As previously explained, two pins will automatically orient themselves substantially in the north-south position.

Accordingly, selector 25 performs a rough sorting operation; selector 21 the main sorting operation and entry opening 8a the final sorting operation. In addition, self-orientation of the pins or other items occurs between selectors 25 and 21 and also between selectors 21 and discharge chute 8 by magnetic force.

It has been found that by providing one or several auxiliary selectors such as selector 25 a very smooth and continuous flow of items through discharge chute 8 is obtained.

The device of FIG. 3 can be readily adapted to different sizes and shapes of items to be sorted and discharged by providing selector bars 21 and 25 the gates of which have outlines appropriate for the specific items to be sorted. The internal peripheral outline of the tube of discharge tube 8 must, of course, be selected in accordance with the shape and size of the items. Similarly, the dispensing device of FIGS. 1 and 2 can be adapted to different sizes and shapes of items by selecting a discharge chute with an appropriately shaped entry opening 8a. The magnetic pads 5 may be left unchanged since they are capable of accommodating a wide range of items.

The dispensing device according to FIG. 6 is similar to the dispensing device according to FIG. 3 in structure and function except that a second circumferential row of magnetic pads 5 is provided. Selector bar 21 includes a second gate 21a for sorting and orienting the items carried by the radially inner row of magnetic pads. The items carried by the inner row of pads are discharged through a second discharge chute 8'.

As is evident, the device of FIG. 6 doubles the output of the device according to FIG. 3. The items such as pins 7 passing through the two discharge chutes may be simultaneously discharged, or in staggered relationship by a release mechanism such as mechanism 10 described in connection with FIGS. 1 and 2.

One or several selectors 25 for rough sorting such as shown in FIG. 3 may be incorporated in the device of FIG. 6.

In the aforedescribed embodiments of the invention, orientation of the items substantially in the direction of circumferental travel is effected by orienting the north-south direction of the magnetic pads in circumferental direction. However, orientation of the items can also be effected by provding guide track 30 such as a circumferential groove as shown in FIGS. 9 and 10. The magnetic elements 31 are disposed in the bottom of the groove in circumferentially spaced relationship. The radial width of the groove is such that the items such as pins 7 are forced into substantially circumferential direction as is shown in FIG. 9. As is evident, no specific orientation of the polarity of the magnetic pads is necessary in such arrangement.

FIG. 11 shows a dispensing device similar to FIG. 6. Two radially spaced circumferential rows of magnetic pads 35 and 36 are provided. The pads in the two rows and a selector 37 having gates 37a and 37b are designed to carry and sort items different one from another. The radial inner row is designed by way of example to carry items such as pins 7. Accordingly, gate 37a has an outline such that it will pass only one pin per magnetic pad as described for instance, in connection with FIG. 3. Pads 35 and second gate 37b are designed to carry and sort flat items such as oval wire rings 38 or circular washers. Items of this kind will also position themselves on the pads by sliding or wriggling on the same in reference to the gate opening as has been previously described so that only one item can reach a position for passage through the gate. To prevent that, two wire rings or washers in super-imposition can pass, the height of the gate is such that it is just slightly in excess of the thickness of the wire ring or washers as is shown in FIG. 12.

The items guided into chutes 8 and 8' may be directly discharged therefrom or such discharge may be controlled by release mechanism 10.

Selector 37 is detachably mounted by brackets 39 or other suitable fastening means so that the dispensing device can be conveniently adjusted for differently shaped items to be sorted and dispensed.

The aforedescribed feeder magazines or dispensing devices are designed for sorting and singly dispensing items irrespective whether one or the other end of the items enters the discharge chute first. However, in certain fields of application, it is desirable or necessary that a predetermined end of the item faces forwardly. For instance, utilization of the dispensed items, such as headed screws or rivets, may make it necessary or desirable that the screws or rivets are discharged with the shank facing forwardly.

FIGS. 13 and 14 show a dispensing device for discharging items directionally oriented, for instance, headed screws 50 or rivets with the shank or the head facing forwardly as desired.

As is readily evident from an analysis of the previously described figures, the selectors as shown in these figures are not capable of differentiating whether one or the other end of an item faces forwardly when it passes through a gate. To effect such directional differentiation, magnetic pads 45 of the kind previously described are disposed at an angle to the circumferential direction rather than aligned with the same as shown in all previously illustrated embodiments. A selector 46, also of the previously described type, that is comprising a selector bar 47 including a gate 48 is detachably mounted by a mounting bracket 49. The selector is disposed at an angle to the radial direction of disk 1 so that successive magnetic pads 45 are substantially in lengthwise alignment with the selector bar when the pad is passing under the same as is clearly shown in FIG. 13. The outline of gate 48 is such that it permits passage of the item such as a headed screw 50 lengthwise of the bar as is shown in FIG. 14. This figure also shows that the narrow end of the gate faces toward bracket 49 if it be desired that the screw is discharged with its shank facing forwardly.

As has been previously described, the action of the selector will reduce a cluster of screws arriving on a pad at the gate to a single screw and such single screw will pass through the gate in a position such that the head of the screw is at the trailing end of the pad in the direction of travel of disk 1. As also previously described, the screw will adjust itself in accordance with the polarity of the pads while travelling from the selector to the discharge chute 8 and will finally discharge into the same with its shank facing forwardly. The screws which have failed to pass the gate will drop back into bin 20.

As has been described in connection with FIGS. 3, 4 and 5, one or more auxiliary or rough sorting selectors similar to selectors 25 may be provided anterior of selector 46, two auxiliary selectors 46a and 46b with appropriately enlarged gates 48 being shown.

Tests have shown that placement of the pads at an angle of approximately 45° and of selector bar 47 at a matching angle produces a fully satisfactory sorting capacity and also permits the use of a standard round discharge tube 8 of appropriate diameter. The screws may be discharged directly to the discharge chute, or may be fed to a release mechanism 10 as described in connection with FIG. 9. As apparent, such mechanism constitutes an intermediate storage allowing for an accurately controlled discharge of screws or other items, for instance, to an assembly machine.

If desired, a degaussing coil 55 may be placed about discharge chute 8 to remove any residue magnetism from the screws. Such a degaussing coil may, of course, also be used in connection with any of the previously or hereinafter described devices.

As previously explained, the dispensing device of the invention can be conveniently adapted to different sizes and shapes of items such as screws 50 by exchanging selector 46.

A change-over to differently shaped screws and other items can also be effected by providing a selector with an adjustable gate as shown in FIG. 15. The selector according to this figure is composed of a multitude of narrow elements 57 which are lengthwise displaceable in reference to each other to define any desired outline of a gate 57a. The elements are held in selected lengthwise positions by any suitable means such as clamping bars 58 secured to each other, for instance, by screws 59.

Figures 16, 17:
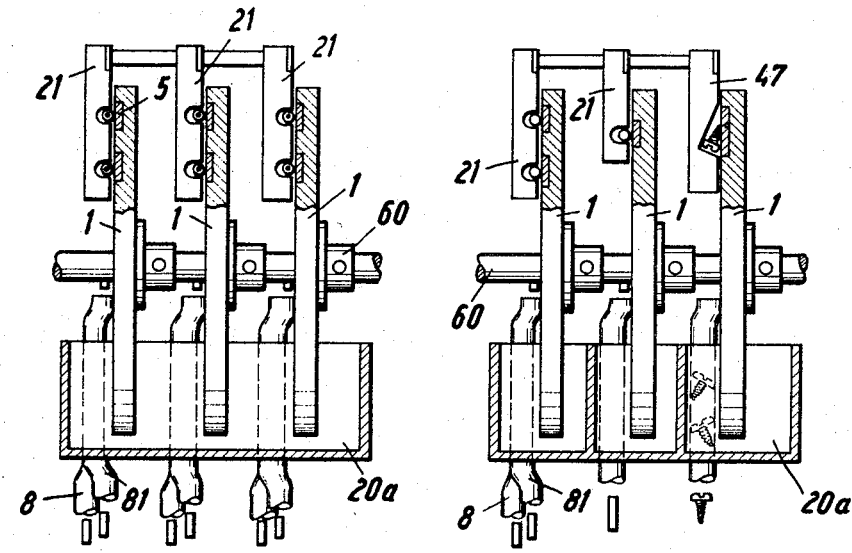
FIG. 16 is an elevational end view of a triple dispensing device according to the invention for dispensing several items either simultaneously, or in staggered relationship.
FIG. 17 is an elevational end view of another triple dispenser for dispensing several differently shaped items.

FIG. 16 shows a multiple dispensing device in which three disks 1 are mounted on a common drive shaft 60. The three disks pick up items to be sorted in a common supply bin 20a. The disks and the magnetic pads thereon are of the type shown in FIG. 6, that is, each disk mounts two radially spaced circumferential rows of magnetic pads and associated selectors 21.

In this connection, it may be mentioned that the disks of the multiple dispenser according to FIG. 16 and also the disks of the previously described dispensers may mount magnetic pads and associated selectors on both sides rather than on one side only.

FIG. 17 is a multiple dispenser similar to FIG. 16, that is, three disks 1 are mounted on a common drive shaft 60. The disks are designed to dispense different items at the same time or in staggered relationship as is clearly indicated in the figure and as is readily apparent from the previous description.

As is also readily evident, any number and type of disks can be conveniently combined as required.

Figure 18:
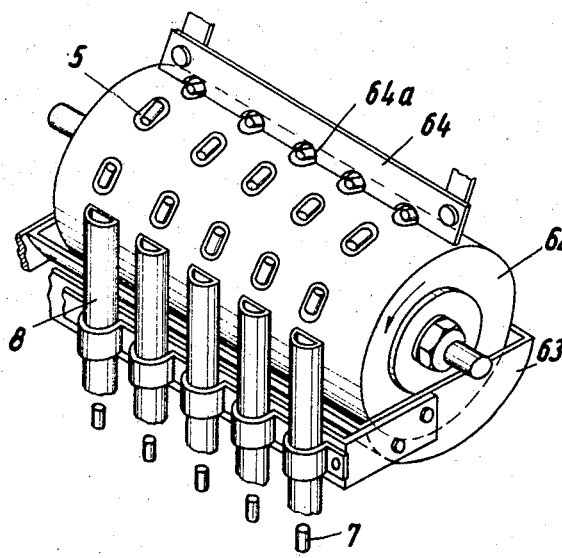
FIG. 18 is a further modification of a multiple dispensing device.

FIG. 18 shows a dispensing device which is similar in principle to the previously described dispensing device except that the magnetic pads 5 are not mounted on a side of a disk but on the peripheral wall of a drum 62 which dips into a supply bin 63 for items during part of its travel. Five axially spaced circumferential rows of magnetic pads 5 are provided. The selector gates 64a, which may be alike or different one from another, are formed in a common stationarily mounted bar 64. Of course, individual selector bars may be used and several circumferentially spaced selector bars may be provided to effect sorting in several stages. The function of the device according to FIG. 18 is apparent from the previous description.

Figure 19:
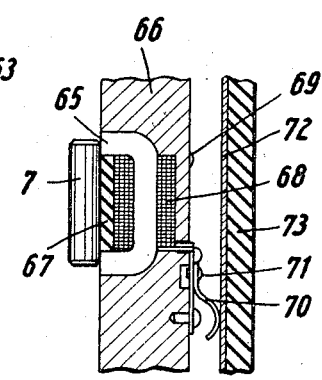
FIG. 19 is a fragmentary sectional view of a dispensing device using electromagnetic elements.

In all the previously described embodiments of the invention, the magnetic pads were presumed to be permanent magnets such as U-shaped magnets. FIGS. 19, 20 and 21 show an arrangement employing electromagnets. According to FIG. 19, a generally U-shaped iron core 65 is locked in place on a disk 66 made of a suitable non-ferrous metal by insulation wedges 67. A coil 68 encompassing the core is connected at one terminal to disk 66 as is indicated at 69 and at the other end to a spring contact 70 which is secured to a disk 66 electrically insulated therefrom, for instance, by screws 71. Spring 70 coacts with a commutator segment 72 extending on a stationarily mounted disk 73 in counter-clockwise direction from six o'clock to nine o'clock. The segment 72 and metallic disk 66 are connected to a source of current as is indicated in FIGS. 20 and 21 by wires 74 and 74a and a commutator ring 98.

As is evident from the previous description, the items to be sorted out such as pins 7 will adhere themselves across the pole elements of core 65 when the same is excited by engagement of contact spring 70 with segment 72. After passing a selector gate as previously described, the pins will be released from the core when spring contact 70 leaves segment 72. The moment of release of the pins and the position of the entry opening 8a of discharge chute 8 must, of course, be appropriately correlated.

FIGS. 22 and 23 show by way of example, the incorporation of a dispensing device or feeder magazine according to the invention in a hand tool or gun for feeding an item such as a rolled or solid pin 7 to a point of insertion such as an opening in a workpiece 75.

The tool comprises a preferably gun-shaped housing 76 having a feed opening 76a leading to a storage space 77 in the housing. The housing preferably comprises two hollow halves suitably secured to each other. A conveyor disk 1 such as previously described, is rotatably mounted in the housing on a shaft 78. The disk mounts a circumferentially spaced row of magnetic pads 5 as also previously described. The magnetic pads 5 coact with a selector 79 including a gate 79a. The outline of the gate is such that it permits passage of one pin only per magnetic pad when such one pin positions itself substantially in alignment with the gate as hereinbefore described. The selector is extended at 79b to form a closure for storage space 77. A discharge chute 80 in the form of a tube extends within a barrel-shaped portion 76b of the housing.

The entry opening 80a of tube 80 is disposed for coaction with conveyor disk 1 and pads 5 thereon as previously described. The other end of tube 80 constitutes the discharge end thereof and terminates close to the muzzle of barrel 76b and a pin positioning member 82, the arrangement and purpose of which will be more fully described hereinafter.

Shaft 78 has fixedly mounted thereon a ratchet gear 83, the teeth 83a of which coact with a preferably spring loaded pivotal pawl 84 supported on a two-arm lever 85 pivotal about a pin 86 secured to a wall of housing 76. The other arm of lever 85 is bifurcated at 85a and engaged by a pin 87 secured to a plunger 88. The plunger is slidably guided in a bore 89 and urged by a spring 90 against a trigger 91 pivotal about a pin 92 in a grip portion 76c of the housing. Lever 91 has an arm 91a coacting with a push rod 93 slidably guided in barrel 76b for lengthwise displacement therein against the action of a spring 94 fitted in a housing space 95. One or several, preferably lengthwise adjustable collars 96 may be provided on rod 93 to limit the stroke of rod 93 by action of a recess 97 formed in barrel 76b.

Muzzle end of rod 93 coacts with the aforementioned pin positioning member 82. This member is more fully described in the aforementioned Patent 3,346,942. It comprises a preferably U-shaped permanent magnet 100 potted in a suitable hardened magnetically inert material such as epoxy. This material bridges the two pole faces of the magnet with a layer which has the cross-sectional outline shown in FIG. 23. More specifically, the layer comprises a thick portion 101 and a thin portion 102. The latter portion is downwardly slanted to form a groove-like portion 103 bridging the two pole faces and joined to the thick or high portion by a preferably steeply slanted wall portion 104. The high edge wall portion 102 is substantially flush with the discharge end of tube 80.

As is readily apparent, the magnetic field strength will be lowest adjacent to the top surface of thick wall portion 101 and it will gradually increase from the high edge of wall portion 102 toward the low edge thereof defining groove 103. Accordingly, the groove 103 constitutes an area of maximum field strength which may decrease to practically zero at the top surface of wall portion 101. Groove 103 is positioned in alignment with push rod 93 as is clearly shown in FIG. 22.

The operation of the tool as hereinbefore described, is as follows:

Let it be assumed that a supply of pins is fed into storage space 71. To operate the tool trigger 91 is squeezed thereby turning the same in counter-clockwise direction. As a result, push rod 93 is displaced toward the right against the action of spring 94 and the forward end 93a of the push rod, which is preferably reduced to substantially the cross-section of groove 103, thus pushes a pin 7 resting in groove 103 into an opening 75a of workpiece 75. The pivotal movement of trigger 91 from the full line position into the dotted line position displaces plunger 88 against the action of spring 90 thereby causing a pivotal movement of lever 85 from the full line position into the dotted line position. When now the trigger is released it is returned by the action of spring 94 into its full line position and lever 85 is pivoted by the action of spring 90 from the dotted line position into the full line position thereby turning disk 1 through a corresponding angle. The turning angle of the disk by each operation of the trigger is such that one pad 5 is caused to pass selector 79. The function of the selector is evident from the previous description. Accordingly, one pin is fed into tube 80 by each operation of the trigger and provided that the tool is held in somewhat downwardly slanted position, is delivered upon positioning member 82. The pins arrive on the top surface of this member in a more or less random position but will automatically position themselves in the groove 103 due to the magnetic field differential adjacent to the top surfaces of wall portions 101 and 102. Each pin settled in the groove will be removed therefrom by the next following trigger action as previously described.

Accordingly, each trigger action effects both feeding of a pin to the muzzle end of the tool and discharge of a pin therefrom.

While the tool of gun of FIG. 22 is equipped with a conveyor disk such as is used in FIG. 3 and orients each item irrespective which end of the item faces forwardly, it is obvious that a disk such as the conveyor disk of FIG. 13 may be used in the tool when it is desired to feed items to the positioning member 82 with a predetermined end of the items facing forwardly. If, for instance, headed screws are to be fed to the positioning member with the shank of the screws facing forwardly, the leading end 93a of rod 93 may be shaped as a screwdriver and the rod is rotated when and while the same is displaced as previously described. Means imparting to the rod a combined lengthwise and rotary motion are self-evident and well known in the art. Similarly, when rivets are to be fed, the forward end of rod 93 may be designed to act as a rivet setter in an also well known manner.

As is also readily apparent the tool of FIGS. 22 and 23 can be conveniently adapted to power operation and directly coupled with an automatic assembly machine.

Figure 25:
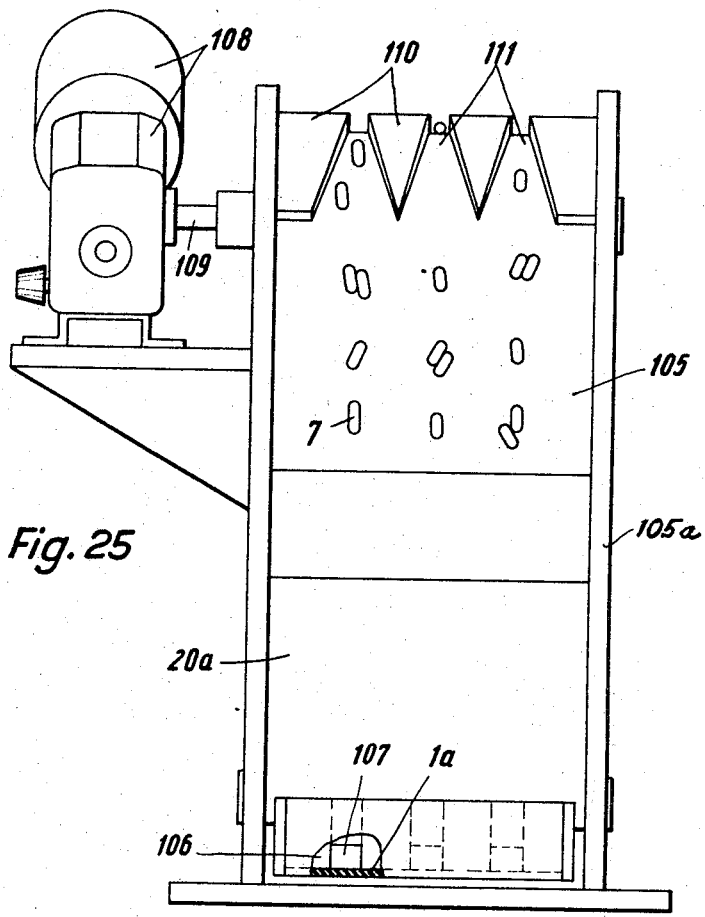
FIG. 25 is a front view of FIG. 24.

The dispensing device according to FIGS. 24 and 25 comprises a preferably strip-like support plate 105 made of, for instance, nonmagnetizable light gauge sheet material or such as non-ferrous metal or a suitable plastic. The plate is stationarily mounted on a suitable frame 105a preferably at a steep upward slant as is clearly shown in FIG. 24. A band conveyor 1a also made of nonmagnetic material is disposed behind plate 15 and is so guided that a portion of the conveyor traveling upwardly moves along a straight path parallel to a straight portion of plate 105 and closely adjacent thereto. The band conveyor mounts a plurality of lengthwise spaced magnetic pads 5, as described in connection with the preceding figures. As is evident, the magnetic field of each pad will close through the sheet material adjacent thereto. One or several rows of said magnetic elements may be provided, three rows being shown in FIG. 25. The conveyor is guided over pulleys 106 and is driven in a conventional fashion, for example, the upper one of pulleys 106 may be driven by a motor 108 via shaft 109 at a desired rotational speed. The pulleys may either have peripheral grooves to accommodate magnetic elements or pads 5 when passing over the pulleys, or several spaced apart pulleys may be provided to accommodate the magnetic elements in spaces 107, as can best be seen in FIG. 25.

The lower part of plate 105 mounts a supply container or bin 20a for pins 7 to be singled in the device and to be delivered one by one into discharge chute 8. One wall of container 20a may be formed by the corresponding portion of plate 105, as can best be seen in FIG. 24. As is evident, each pad as it passes the lower position of plate 105 will attract one or several pins and cause the same to slide upwardly along the plates always in juxtaposition to respective pad 5.

The device according to FIGS. 24 and 25 has the advantage that desired paths of movement such as angular movements or movements along irregular lines can be readily imposed upon the pins by correspondingly controlling the path of travel of elements 5 behind plate 105.

It is also conveniently possible to control the movements of the items on plate 105 by mechanical guide means. There is shown in FIG. 25 a guide member 110 including several channels 111 inwardly tapered in the direction of travel of pins 7. Channels 111 are so shaped that the narrow end of each channel constitutes a throat permitting passage of one pin only in a substantially lengthwise orientation. In other words, the guide member 110 and the channels 111 thereof constitute a selector functioning in the manner of selectors 21 as previously described.

Each pin 7 after having passed guide channel 111 assigned to it, enters the respective discharge chute 8, the receiving end of which is preferably located closely adjacent to the discharge end of guide member 110.

It is, of course, also possible to use other discharge means in association with guide member 110, for instance, open troughs disposed either horizontally or at a downward slant.

A further advantage of the device according to FIGS. 24 and 25 is that wear and tear of the device due to the continuous frictional contact with the items to be sorted and dispensed occurs only at plate 105 and this plate can very easily and inexpensively be repaired or replaced when necessary.

The orientation action by guide channels 111 can be assisted by orienting the north-south direction of the magnetic elements 5 so that the items arrive at the channels already substantially oriented.

The operation of the device is readily evident from the previous description. Any pin which fails to pass the respective guide channel 111 will fall back into container 20a.

A device as shown in FIGS. 24 and 25 is particularly suitable for picking up, singling, orienting and discharging of comparatively long items since the magnetic pads 5 on conveyor band 1a travel a comparatively long distance in magnetically coacting relationship with the items in the container so that they are capable of attracting even long items in the same.

The dispensing device according to FIGS. 26 and 27 is similar in function to the dispensing device as shown in FIGS. 13, 14 and 15 in that the device not only singles the items to be dispensed, but also orients the same so that a predetermined end thereof faces forwardly when arriving at the discharge station. As stated before, it is often necessary or at least desirable that items such as headed screws or rivets are delivered to a point of utilization with the shank facing forwardly.

According to FIGS. 26 and 27, a conveyor disk 1b is driven by a motor 112. The disk has fitted in one of its sides magnetic elements or pads 5, the north-south polarity of which is radially directed. The magnetic elements are preferably flush with the surface of the disk, as has been previously described. The disk, with the magnetic elements thereon, is rotatably mounted in a circular recess 113 of a frame 114. A support or cover disk 105a made of nonmagnetizable sheet material such as nonferrous metal or plastic, is fixedly secured on frame 114 parallel with and closely adjacent to disk 1b so that the flux lines of elements 5 will close through disk 105a and attract the headed items to be singled such as rivets 7a. A container or bin 20b for a supply of rivets is provided at the lower portion of the frame, the bottom part of disk 105a preferably constituting one of the walls of the container. As is clearly seen in FIG. 26, magnetic elements 5 travel during part of their circular paths along the part of disk 105a constituting a container wall. Accordingly, single rivets or clusters of such rivets are picked up by magnetic attraction and are carried along fixed disk 105a as described in connection with the preceding figures. Due to the radial orientation of the polarity of the magnetic elements, rivets moving on disk 105a will undergo a pre-orientation as it is indicated in FIG. 27 in which two rivets both attracted by the same magnetic element are substantially radially disposed.

The device further comprises a discharge trough or tube 115 which has a slotted receiving portion 116. This portion has a curvature such that its receiving opening is substantially tangential with the travel direction of rivets when arriving at the receiving end. The remaining portion of discharge tube or trough 115 is preferably downwardly slanted so that it constitutes a slide.

As is evident, the shank of only one of the two rivets shown in FIG. 27 adhered to disk 105a by magnetic attraction, namely the upper left one, can enter slotted portion 116 and slide along the same, the flat rims 117 of the trough or tube 115 constituting supports for the head of the rivet. The second rivet will fall back into supply container 20b.

The scooped-up rivet will travel in trough or tube 115 to a point of utilization or to a storage bin.

In some instances, it is desirable to orient the items not only with respect to the end facing forwardly, but also in relation to a support surface from which they are withdrawn for utilization, for instance, for insertion into a mounting hole of a workpiece. Such further positioning of items may be effected by means of a positioning head 82 as is shown in FIG. 23 and described in connection therewith.

Figure 28:
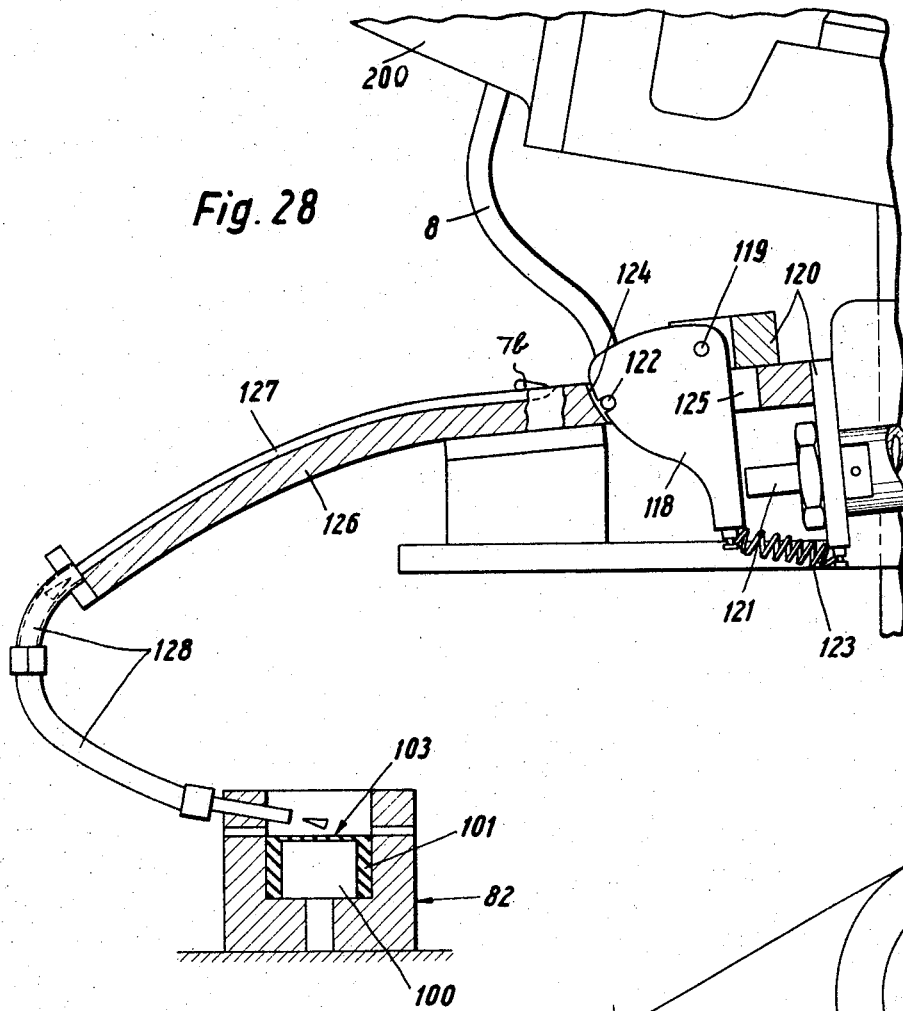
FIG. 28 is a fragmentary elevational view, partly in section, of a further modification of the dispensing device of the invention in conjunction with a positioning device.
Figure 29:
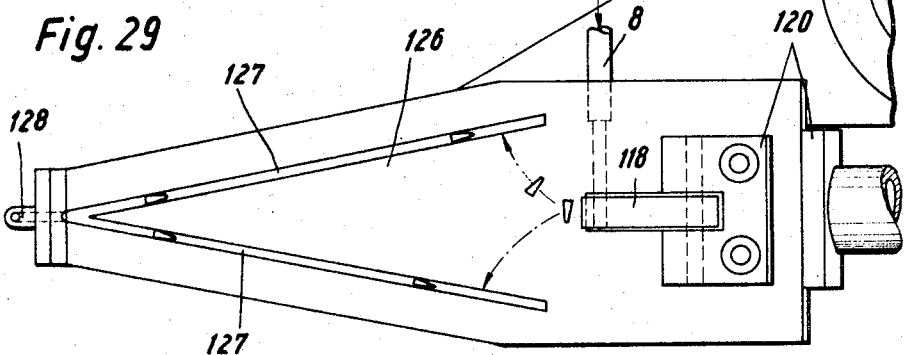
FIG. 29 is a plan view of FIG. 28.

FIGS. 28 and 29 show another dispensing device according to the invention which is coupled with a positioning head.

The device as shown in FIGS. 28 and 29 should be visualized as including singling means of the kind previously described. It should further be assumed that items are received one by one from a container or bin 200 through discharge chute 8. This chute terminates, preferably in horizontal direction, as is indicated in FIG. 29, at a conveyor member 118, which is pivotal about a pivot 119 in a frame 120. The member 118 is biased by a spring 123 attached at one end to the lower end of the member into the illustrated angular position. A plunger 121, which should be visualized as being cyclically operated, pivots member 118 intermittently in clockwise direction. The member has in one of its walls a cut-out 122, shaped to receive an item such as a conical pin 7b (see FIG. 29) when the member is biased into the illustrated angular position between each two activations of plunger 121. Pivotal member 118 extends into a cut-out 125 of a downwardly slanted plate 126. The edge portion of the member including recess 122 is closely adjacent to one edge of cut-out 125, preferably both the edge and the respective wall portion of member 118 being curved so that the member can swing in close proximity to plate edge 124. When now member 118 is pivoted by plunger 121 in clockwise direction, recess 122 is lifted above the level of plate 126 so that the pin which has lodged itself previously in recess 122 after leaving chute 8, will roll out of the recess and upon plate 126. This plate has two guide grooves 127, the width of which is substantially equal to the maximal diameter of pins 7b, or other items to be oriented. The pins, after leaving recess 122, will roll on the plate with the wide thus heavier end facing forwardly due to gravity, until they are stopped by falling into either one of guide grooves 127 in which they will slide downwardly with the wide end facing forwardly. The two grooves lead to a common discharge chute 128 through which all the pins now slide upon positioning head 82. The positioning head is similar in structure and function to the positioning head shown in FIG. 23 and described in connection therewith, that is, a permanent magnet 100 is potted in a body 101 of hardened non-magnetic material in which a groove 103 constitutes an area of maximal flux density. Reference is made in this connection to the aforementioned prior Patent 3,346,942.

The device according to FIGS. 28 and 29 is particularly suitable for dispensing conical pins and also rivets.

Figure 31:
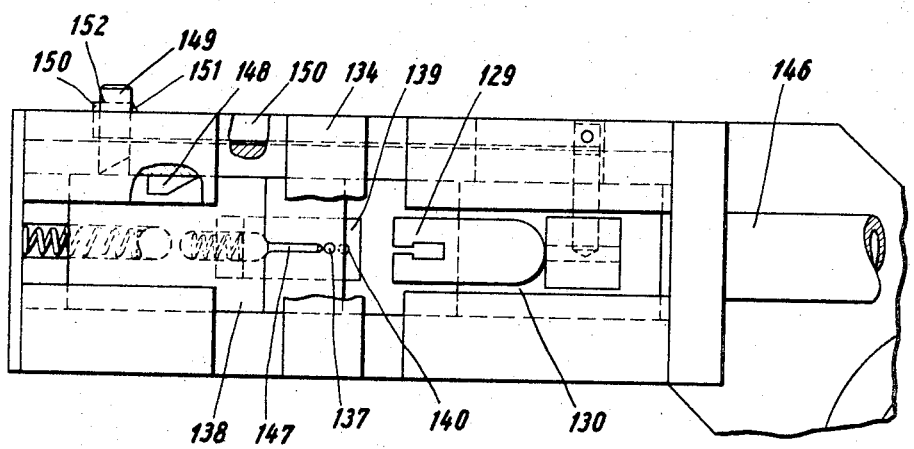
FIG. 31 is a plan view of FIG. 30.
Figure 30:
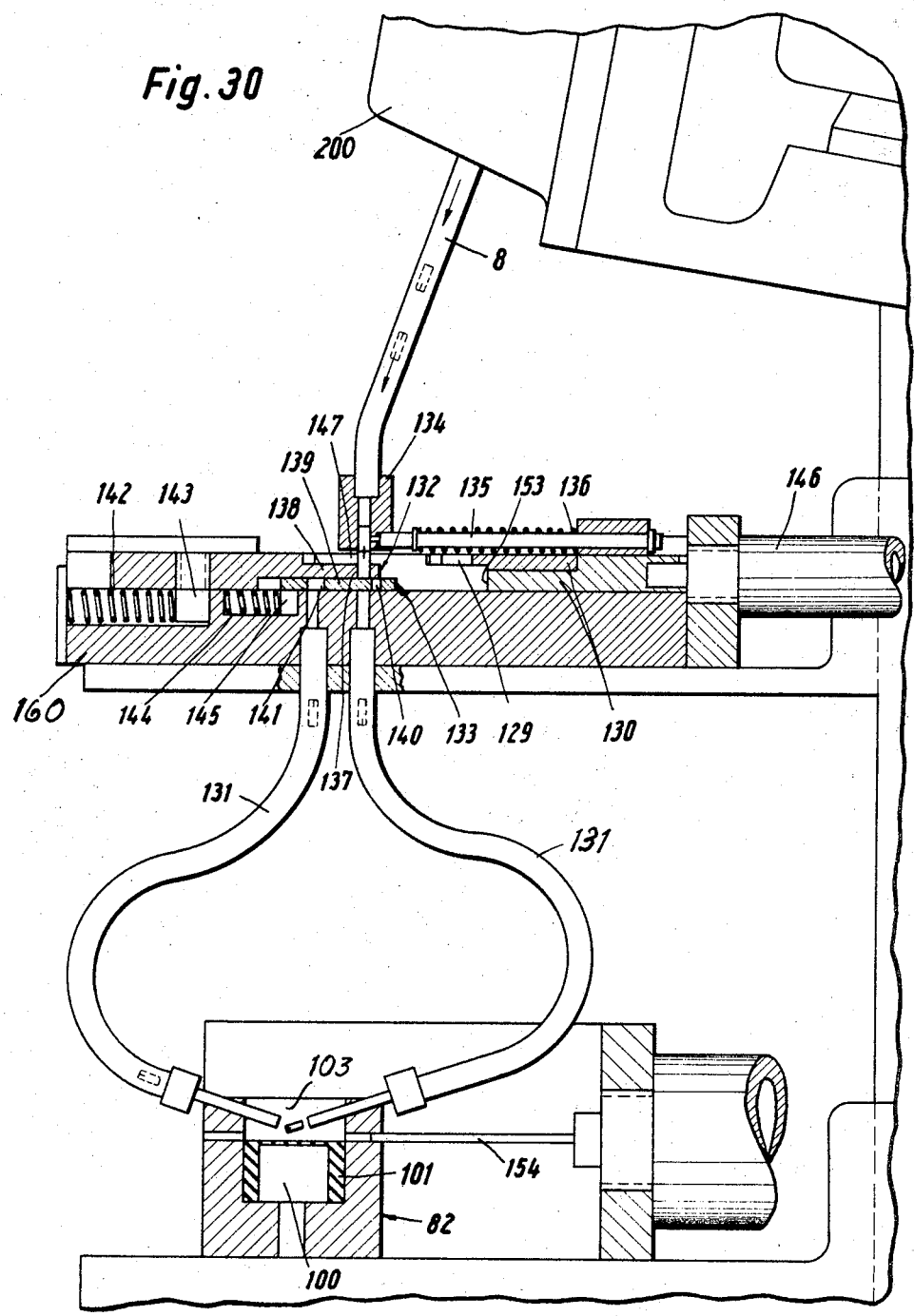
FIG. 30 is a fragmentary elevational view, partly in section, of a further modification of the dispensing device of the invention in conjunction with a positioning device.

FIGS. 30 and 31 show a dispensing device which is particularly suitable for singling and discharging one by one items which have a comparatively slight different shape at one or both ends such as notched pins, partly flattened pins or pins with a slight taper at one end, etc.

The dispensing device as shown in FIGS. 30 and 31 should be visualized as coacting with one of the dispensing devices previously described. Single items are supplied to the device through chute 8 from a bin 200. The device of FIGS. 30 and 31 comprises a probe 129 capable of probing the part of the length of items to be oriented. The probe is mounted on the forward end of a slide 130. Two discharge chutes 131 have receiving openings in the upper surface of a plate 160 which also supports slide 130 and discharge ends disposed in opposition to each other, as is shown in FIG. 30. Locking plates 132 and 133 are slidable into and out of positions covering and opening respectively the receiving openings of chutes 131 in plate 160. Movements of plates 132 and 133 into positions opening either one of chutes 131 are controlled by displacement of slide 130. The items, such as pins notched at one end, are guided through discharge chute 8 into a bore of a receiving member 134 in which they can be arrested by means of a plunger 135 supported on slide 130 and urged by a coil spring 136 toward the left, that is, into a position for pressing against a pin in the bore of receiving member 134.

Slide 130 and probe 129 are shown in FIG. 3 in the righthand or withdrawn limit position, that is, in the position shortly before the beginning of a new working cycle. The lowermost of the pins is shown in a receiving opening 137 of a further displaceable blocking member 138 which is in its forward position. In this position of member 138, the receiving bore 137 thereof is aligned with the receiving opening of the righthand discharge chute 131, but the pin cannot enter the chute because the entry opening of righthand chute 131 is still blocked by a lower blocking member 139. This member has a passage opening 140 for the righthand chute 131 and a passage opening 141 for the lefthand chute 131. The upper blocking member 138 is retained in the position shown in FIG. 30 by a spring 142 which acts against a lug 143 secured, for instance, by a screw connection in upper blocking member 138. The lower blocking member 139 is retained in its position in a similar manner by a spring 144, which acts against a lug 145 secured to blocking member 139, as is shown in FIG. 30.

Let it now be assumed that a notched pin is located in the receiving opening 137 of upper blocking member 138 and that the notching in the pin is at the trailing end thereof, as seen in the direction of movement of the pin through chute 8. Slide 130 and probe 129 are now moved by suitable drive means, such as pneumatic or hydraulic means, forwardly whereby the probe 129 probes the pin. A pneumatic or hydraulic drive is diagrammatically indicated in FIG. 3 by a cylinder 146. In the aforedescribed position of the pin, the notch thereof is so located in reference to probe 129 that the pin cannot pass through the probe and hence remains in front of the probe. Accordingly, slide 130 now displaces this pin together with the upper blocking member 138 against the action of spring 142. To assure a smooth displacement of the pin without deforming the same, the upper blocking member 138 is provided with an abutment member 147 against which the upper, that is, the trailing part of the pin, can abut while the pin is being displaced. Slide 130 now pushes the notched pin together with the upper blocking member 138 so far back toward the left that the receiving opening 137 of the upper blocking member is in registry with the lefthand chute 131. The lower blocking member 139 does not change its position during such pushing back of lower blocking member 138.

To enable the pin to fall out of receiving bore 137 and thus through the passage opening 141 of the lower blocking member 139 into the lefthand discharge chute 131, the upper spring-loaded blocking member 138 must be temporarily retained in its pushed back position. To effect such temporary retention, the upper blocking member 138 has a lateral recess 148 which is engaged in the pushed back position of member 138 by a preferably spring-loaded detent 149. When now after such retention of member 138, slide 130 moves back the pin is freed by plunger 135 and can drop down. To release the detent and to move the upper blocking member 138 again into its forward position, an actuating rod or rail 150 is laterally mounted on slide 130. Rod 150 has a cam surface in the form of a slanted surface 151 at its leading or head end. This leading end is guided in a recess 152 of detent 149. As can best be seen in FIG. 31, the detent 149 is forced by cam surface 151 out of recess 148 of upper blocking member 138 upon completion of the return movement of slide 130. Blocking member 138 can now be returned by spring 142 into its forward end position.

Let it now be assumed that a notched pin occupying the receiving opening 137 of upper blocking member 138 is so located that the notched end of the pin faces forwardly in the direction of travel. When now slide 130 is pushed forward, the trailing thinner end of the pin can pass probe 129 mounted at the forward end of slide 130. Consequently, the upper blocking member 138 is not displaced when slide 130 moves further forwardly, but toward the end of the forward movement of slide 130 an abutment surface 153 now engages the forward end of the lower blocking member 139 whereby the lower blocking member 139 is pushed back by slide 130 into a position in which the passage opening 140 of the lower blocking member 139 is in registry with the receiving bore opening 137 of the upper blocking member 138 and also with the righthand discharge chute 131. Since the pin is not retained by plunger 135, it is free to fall into the respective chute 131.

As is now evident, the righthand chute 131 can be entered only by pins, the notched end of which faces forwardly in the direction of travel while the lefthand chute 131 can be entered only by pins, the notched end of which faces rearwardly.

As is shown in FIG. 30, the discharge ends of chutes 131 are disposed in opposition above positioning head 82. The positioning head of FIG. 30 is similar in principle to the positioning head shown in FIGS. 23 and 29 and described in connection therewith. Accordingly, it comprises a magnetic core 100 potted in a body 101 made of a suitable hardened nonmagnetizable material. In one surface of body 101 a groove 103 is provided to define an area of high flux density. The head is preferably mounted in a frame as is diagrammatically indicated. A plunger 154 intermittently driven by suitable drive means such as hydraulic or pneumatic drive means, also diagrammatically indicated, ejects pins successively positioned in groove 103, one by one from the positioning head to move such pins to a point of utilization, for instance, to insert the pins into a mounting opening of a workpiece.

As is evident from the previously described functions of the several coacting members and slides and the disposition of the discharge ends of chutes 131 in opposition, all the pins will reach groove 103 of positioning head 82 with the notched end facing in the same direction.

Figure 32:
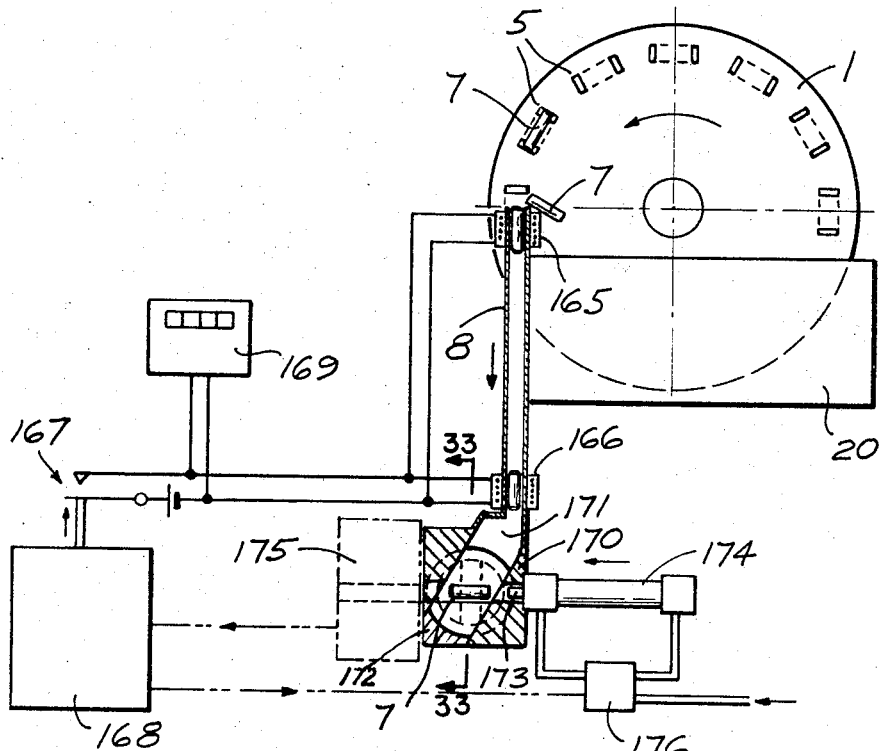
FIG. 32 is a diagram of an electromagnetically operated discharge control system of a dispensing device according to the invention.

In all the aforedescribed exemplifications of the invention, removal of singled and positioned items from the dispensing device proper via a discharge chute such as chute 8 is mechanically controlled, for instance, by intermittent movements of a suitably controlled plunger. FIG. 32 shows an electro-magnetic control of the passage of items such as pins 7 through discharge chute 8. According to FIG. 32, two solenoids 165 and 166 are so positioned that each when energized will generate a magnetic field retaining a magnetizable item such as a pin positioned in chute 8 substantially in juxtaposition with the respective solenoids. Solenoid 165 is positioned at the receiving end of chute 8 and the second solenoid 166 is lengthwise spaced from solenoid 165; it may be disposed at or near the discharge end of the chute. The dispensing device proper is shown diagrammatically; any one of the previously described dispensing devices may be adapted for use with the electromagnetic control of FIG. 32. There is indicated a dispensing device of the type illustrated in FIGS. 1 and 2. The function thereof is obvious from the previous description. It suffices to state that pins 7 will arrive singled and positioned at the receiving end of chute 8.

The two solenoids are connected in a suitable energizing circuit which is simultaneously open and closed respectively for both solenoids by a switch 167. This switch is operated at predetermined time intervals by a cycling assembly 168 of conventional design. Many suitable cycling devices are well known in the art and available in the market.

The electromagnetic control system as hereinbefore described functions as follows:

Two pins are shown juxtapositioned with the solenoids, that is, in positions in which they are retained by the magnetic fields of the solenoids. Switch 167 is shown open and accordingly FIG. 32 illustrates the moment of the beginning of a deenergization interval. Hence, the upper pin will begin to drop toward solenoid 166 and the lower pin will start its downward movement in chute 8. The cycling for the time intervals at which the solenoids are energized and deenergized is so set that the solenoids are reenergized before the pin now shown in the upper position has time to pass lower solenoid 166. In other words, the drop time for the pins required to travel from solenoid 165 to solenoid 166 is longer than the deenergization time. It may be mentioned in this connection that the deenergization period may be shorter than the energization period. Accordingly, the pin initially in the upper position will now be retained in the lower position and a new pin arriving at the entrance of chute 8 will be electromagnetically retained by solenoid 165.

As is evident, the pin retained by solenoid 165 blocks chute 8 until the lower pin has moved out of the chute so that a pile up of pins in the chute is effectively prevented.

The rotational speed of disk 1 is preferably higher than the cyling speed of the device to compensate for an occasional empty magnetic pad 5. If a pin should arrive at the chute 8 while the entrance opening thereof is blocked, such pin will simply fall back into the supply bin 20, as it is indicated in FIG. 32.

An electric counter 169 of conventional design may be provided either to indicate the number of dispensed pins, or to shut off the device after a selected number of pins has passed through chute 8.

As is evident, cute 8 and more specifically, the length thereof between solenoids 165 and 166 constitute in effect a delay device. It is, of course, also possible to use an electric or electronic delay device. A straight tube is shown which is often preferable since travel time tends to be at a minimum in a straight tube, but a curved tube can also be used. Moreover, more than two solenoids may be provided, especially when the discharge tube is of considerable length.

Figure 33:
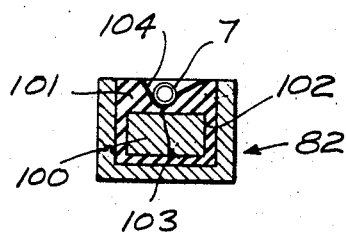
FIG. 33 is a fragmentary section taken on line 33—33 of FIG. 32 and turned counterclockwise through 90°.

The electromagnetic control assembly of FIGS. 32 and 33 may be coupled with an ejection mechanism. Such mechanism is diagrammatically shown as comprising a block 170 and a stop 172 both made of non-ferrous metal or plastic and including a channel 171 leading from the discharge end of chute 8 to positioning head 82. The positioning head and its function are described in connection with FIGS. 22 and 23 and more in detail in aforementioned U.S. application Ser. No. 476,839, now Patent No. 3,346,942. As is evident from the previous description, any pin 7 reaching the positioning head will automatically position itself in groove 103 thereof by magnetic attraction. A plunger 173 which may be electrical, hydraulically or pneumatically driven by a suitable and conventional drive means 174, serves to drive successive pins positioned in groove 103 to a point of utilization such as a workpiece diagrammatically indicated at 175. A cycling means of conventional design diagrammatically indicated at 176, serves to operate driver 174. Cycling means 168 and 176 are suitably synchronized in a conventional and well understood fashion.

The entire control system as shown in FIGS. 32 and 33 may be conveniently correlated with the requirements of a specific machine in connection with which it is used, as is indicated by dotted lines leading from workpiece 175 to cycling assembly 168 and from this assembly to cycling assembly 176.

We claim:

1. A device for successively dispensing elongate magnetizable items, one by one, in directionally oriented position, said device comprising in combination:

an endless nonmagnetic conveyor mounted for travel along a predetermined path;

magnetic elements secured to said conveyor lengthwise spaced apart and oriented generally north-south in the direction of travel thereof, said conveyor being arranged to pass during part of its travel through a supply of randomly disposed items for attracting one or more of said items by the magnetic elements as the same successively pass through said supply and carrying along the attracted item or items with a single item approximately north-south oriented and others in random positions on the magnetic elements slidable thereon; and a stationay selector means including a passage opening having an outline approximately corresponding to a selected outline portion of the items to permit passage of the approximately north-south oriented item only, said selector means being disposed posterior of the location of the supply with its opening across the path of the magnetic elements and adjacent thereto whereby at least partial engagement of the approximately north-south oriented item on any one of the magnetic elements with said opening in the selector means causes the engaged item to slide on its magnetic element into a position oriented for passage of said item through said opening and to be pulled through the opening by continued movement of the respective magnetic element past said opening while other items carried on the same magnetic element are stripped therefrom at the opening of the selector means.

2. A device according to claim 1 and comprising a second selector means ncluding a stationary nonmagnetic barrier defining a gate permitting passage only of the approximately north-south oriented item on any one of the magnetic elements, and wherein the first selector means comprises a discharge chute disposed posterior of said gate to receive items passing the same, said discharge chute being disposed spaced apart from the second selector means to provide space and time for items having passed the gate to orient themselves on the magnetic elements accurately in accordance with the polarity orientation thereof before reaching the discharge chute.

3. A device according to claim 1 wherein said selector means comprises a discharge chute having an elongated receiving portion aligned with the travel direction of the north-south orientation of magnetic elements arriving at said receiving portion.

4. A device according to claim 1 wherein said magnetic elements are inserted in the conveyor preferably substantially flush therewith and have an outline permitting limited random movements of one or several items on each element.

5. A device according to claim 1, wherein said conveyor includes a guide track extending in the travel direction of the conveyor, said magnetic elements being disposed in said guide track lengthwise spaced therein, the width of the guide track being such that items retained in the track on one of the magnetic elements by magnetic attraction are oriented in a position for entry into said opening of the selector means.

6. A device according to claim 1 and comprising a receptacle for a supply of randomly oriented items, said conveyor being disposed to dip into said receptacle during said part of its travel.

7. A device according to claim 2 wherein the outline of said gate corresponds to the maximal cross-sectional outline of said items.

8. A device according to claim 2 wherein said barrier is composed of a plurality of elements adjustable in reference to each other to vary the outline of the gate by adjusting the relative positions of said elements.

9. A device according to claim 2 for singly dispensing headed items with a predetermined end thereof facing forwardly when arriving at the discharge chute, wherein said magnetic elements are elongate and disposed at an angle to the direction of travel of the conveyor, and said barrier is disposed at approximately the same angle, the outline of the gate in said barrier corresponding substantially to the lengthwise outline of the headed items.

10. A device according to claim 2 wherein said discharge chute has an internal cross-sectional outline of a width less than the length of the items to maintain the same substantially in the directional orientation which they had when arriving at the entry end of the chute.

11. A device according to claim 2 wherein a release mechanism at the discharge end of the chute releases the same therefrom one by one at selected time intervals.

12. A device according to claim 2 wherein several conveyors are driven by a common drive means, each of said conveyors having one of said second selector means associated therewith for dispensing several items at predetermined intervals, said selector means having passage openings shaped different one from another to accommodate differently shaped items.

13. A device according to claim 1 wherein said conveyor comprises a rotary disk mounting said magnetic elements at least on one side in circumferentially spaced relationship.

14. A device according to claim 13 wherein said magnetic elements are circumferentially oriented on said disk, and comprising a second selector means including a stationary nonmagnetic barrier defining a gate permitting passage only of the approximated north-south oriented item on any one of the magnetic elements, said barrier being substantially radially disposed on the disk, and wherein said first selector means comprises a discharge chute, the entry opening of said discharge chute being substantially aligned with the direction of travel and orientation of the magnetic elements when arriving at said entry opening.

15. A device according to claim 14 wherein said magnetic elements are elongate and define an angle in reference to the direction of movement of the elements, the north-south direction of the elements coinciding with the lengthwise axis thereof, said barrier being disposed at substantially the same angle and the outline of the gate thereof corresponding substantially to the lengthwise outline of the items.

16. A device according to claim 15 wherein said magnetic elements and said barrier define an angle of about 45° with the radial direction on the disk.

17. A device according to claim 13 wherein said disk mounts several radially spaced circumferential rows of magnetic elements, one selector means being provided for each of said rows.

18. A device according to claim 1 wherein said conveyor comprises a rotary drum mounting on its peripheral wall at least one row of magnetic elements in circumferentially spaced relationship, one selector means being provided for each of said rows.

19. A device according to claim 1 wherein said magnetic elements are permanent magnets.

20. A device according to claim 1 wherein said magnetic elements are electromagnetic means each connected in circuit with a source of current, and wherein switch means in each of said circuits are automatically and intermittently opened when the respective electromagnetic means has passed the selector means to release the item which has passed the selector means from the respective electromagnetic means by temporarily collapsing the magnetic field thereof.

21. A tool for feeding a magnetizable member to a point of utilization, said tool comprising a housing; an endless nonmagnetic conveyor mounted in said housing; a plurality of magnetic elements mounted on said conveyor spaced apart in the direction of travel of the conveyor, said housing including a storage space for a supply of said members and said conveyor being disposed to pass for part of its travel through said storage space to attract one or several of said members by the magnetic elements and to carry the attracted members or member along in random positions and slidable on the elements in reference to each other; selector means stationarily mounted in said housing, said selector means including a passage opening permitting passage of the opening by a single member per magnetic element only and in a predetermined position in reference to said opening, additional members adhering to the same magnetic element being removed therefrom by passage of said magnetic element past the selector means; a positioning means supported by the housing; a discharge duct for feeding successive members passed by the selector means to the positioning means, said positioning means including a nonmagnetic support member having a support surface, and means for generating adjacent to one portion of said support surface a higher density of magnetic flux lines per area unit than adjacent to another surface portion, the surface portion having the higher density constituting a receiver for the members fed thereupon to cause orientation of each of said members on said surface in a predetermined position in reference thereto; and an actuating means moving said conveyor through a distance causing passage of one member through the selector means and discharging a member oriented on said positioning means in response to an operation of said actuating means.

22. A tool according to claim 21 wherein said conveyor comprises a rotary disk having said magnetic elements mounted thereon in circumferentially spaced relationship, and wherein said selector means comprises a barrier extending across the path of travel of said magnetic elements and including a gate for passage of a single member only per magnetic element.

23. A tool according to claim 22 wherein said barrier constitutes a cover for said storage space.

24. A tool according to claim 22 wherein said actuating means comprises a pivotal spring-loaded trigger actuating a pawl and ratchet assembly coupling the trigger to the disk for a step by step rotation of the disk, said trigger further actuating a spring-loaded rod for discharging said member from said positioning means.

25. A device according to claim 1 wherein a support and guide plate of nonmagnetizable sheet material is stationarily mounted with one of its sides parallel and closely adjacent to a part of the travel path of the conveyor having the magnetic elements thereon for causing the magnetic fields generated by the magnetic elements to close through said plate, said selector means being mounted on the other side of said plate, and wherein a supply container for the items to be dispensed is provided on said other side of the plate in a position such that magnetic elements on the conveyor pass said container in magnetically coacting relationship with items therein thereby attracting items in the container and moving the attracted items along said plate and into coacting relationship with said selector means.

26. A device according to claim 25 wherein a part of said support plate constitutes a wall portion of said container.

27. A device according to claim 25 wherein said selector means comprise a guide member defining a guide channel tapered in the direction of travel of the conveyor, the minimum width of said channel permitting passage of one item only in said approximately north-south orientation thereof.

28. A device according to claim 25 for singly dispensing headed items in a predetermined position thereof, said selector means comprising a discharge chute for discharging items moving along said support plate, said discharge chute having an entry portion placed in the travel path of the items and shaped to accept only single items in said predetermined position.

29. A device according to claim 1 for singly dispensing profiled items with a predetermined end thereof facing forwardly, wherein said selector means comprise probe means probing the position of items fed to said probe means, several discharge ducts and distributing means controlled by said probe means for distributing the items upon the discharge chutes in accordance with the positioning of the ends of the items.

30. A device according to claim 1 wherein said selector means comprise an elongated discharge chute of nonmagnetizable material disposed for gravity discharge of items carried one by one to a receiving opening of the chute, a pair of solenoids disposed in reference to said chute so as to magnetically retain two items positioned in the chute adjacent to said solenoids, a first one of said solenoids being disposed at the receiving end of the chute and the second solenoid below the first one, and control means for controlling the energization of said solenoids, said control means including cycling means opening and closing energizing circuits for both said solenoids for predetermined time intervals, the length of the chute between the two solenoids and said time intervals being so correlated that the time required for a gravity drop of an item from the position juxtaposed to the first solenoid to the position juxtaposed to the second solenoid is in excess of the period for which the solenoids are deenergized whereby upon the beginning of a deenergization period a first item retained by the first solenoid drops toward the second solenoid and a second item retained by the second solenoid continues its drop in the discharge chute and upon the beginning of the next following energization period the first item is retained by the lower solenoid and a new item reaching the receiving opening of the chute is retained by the first solenoid until the beginning of the next deenergization period.

31. A device according to claim 30 and comprising ejecting means for ejecting one by one successive items having passed the second solenoid, said ejecting means being also cyclically controlled by said control means so that they are activated in cycle with the energization and deenergization of the solenoids.

References Cited

UNITED STATES PATENTS 2,836,947  6/1958  Day et al.   221—212 X
3,065,841  11/1962  Stover   221—160 X STANLEY H. TOLLBERG, *Primary Examiner.*

U.S. Cl. X.R.

221—212